United States Patent [19]

Echt

[11] Patent Number: 5,461,362
[45] Date of Patent: Oct. 24, 1995

[54] INERTIAL BRAKE LIGHT SYSTEM FOR AUTOMOBILES

[75] Inventor: Jeffrey Echt, Highland, Ill.

[73] Assignee: Saline Electronics, Inc., Highland, Ill.

[21] Appl. No.: 136,162

[22] Filed: Oct. 15, 1993

[51] Int. Cl.$^6$ .................................................. B60Q 1/50
[52] U.S. Cl. ..................... 340/467; 340/463; 340/464; 340/479; 340/428; 340/471; 200/61.45 R
[58] Field of Search .................... 340/463, 464, 340/479, 428, 429, 471, 472; 200/61.45 R

[56] References Cited

U.S. PATENT DOCUMENTS

| | | |
|---|---|---|
| 1,627,061 | 5/1927 | Ogden . |
| 2,971,067 | 2/1961 | Ticknor ........................ 200/61.47 |
| 3,258,746 | 6/1966 | Bumpous . |
| 3,479,982 | 11/1969 | Honcharenko . |
| 3,513,800 | 5/1970 | Radgens ........................ 116/37 |
| 3,576,527 | 4/1971 | Howard ........................ 340/479 |
| 3,593,278 | 7/1971 | Bower ........................ 340/467 |
| 3,629,820 | 12/1971 | Sakurai ........................ 340/479 |
| 3,708,782 | 1/1973 | Mori ........................ 340/479 |
| 3,760,353 | 9/1973 | Hassinger ........................ 340/479 |
| 3,939,316 | 2/1976 | Stropkay ........................ 200/82 |
| 4,170,723 | 10/1979 | Arsoy ........................ 200/61.89 |
| 4,176,340 | 11/1979 | Steinmeier ........................ 340/479 |
| 4,384,269 | 5/1983 | Carlson ........................ 340/479 |
| 4,876,525 | 10/1989 | Gross ........................ 340/436 |
| 4,990,886 | 2/1991 | Stanulis ........................ 340/467 |
| 5,017,904 | 5/1991 | Browne et al. ........................ 340/479 |
| 5,089,805 | 2/1992 | Salsman ........................ 340/467 |
| 5,309,141 | 5/1994 | Mason et al. ........................ 340/467 |

OTHER PUBLICATIONS

K. S. Rutley and D. G. W. Mace, Road Research Laboratory Ministry of Transport, 1969.

Rudolf G. Mortimer, SAE Technical Paper Series, Feb. 23–27, 1981.

R. G. Mortimer, Field Test Evaluation of Rear Lighting Deceleration Signals, Oct., 1981.

John Voevodsky, Rear-End Collisions Reduced: A Large Scale Experiment under Natural Conditions, Aug. 12–16, 1974.

*Primary Examiner*—John K. Peng
*Assistant Examiner*—Daryl C. Pope
*Attorney, Agent, or Firm*—Senniger, Powers, Leavitt & Roedel

[57] ABSTRACT

A system of the present invention for signaling panic braking of a vehicle at or above a preset rate. The vehicle has a brake pedal movable from a nondepressed position to a depressed position for braking the vehicle. The nondepressed and depressed positions correspond to open and closed positions, respectively, of a brake light switch. The vehicle energizes at least one brake light when the brake light switch is in its closed position. The system of the invention includes a mercury switch for detecting a deceleration rate of the vehicle and generates a signal representative of panic braking when the deceleration rate of the vehicle reaches or exceeds the preset panic braking rate. The system also includes a flasher circuit connected in series between the brake light switch and the brake light for flashing the brake light and a silicon-controlled rectifier (SCR) circuit for actuating the flasher circuit in response to the panic braking signal and for maintaining actuation of the flasher circuit so long as the brake light switch is in its closed position.

14 Claims, 1 Drawing Sheet

5,461,362

INERTIAL BRAKE LIGHT SYSTEM FOR AUTOMOBILES

BACKGROUND OF THE INVENTION

This invention relates generally to systems for indicating hard or panic braking of a vehicle, such as an automobile, and, particularly, to inertial systems for controlling the vehicle's brake lights.

Automobile accidents are a leading cause of death and personal injury in the United States as well as in other countries. In particular, rear end collisions often result in permanent neck, back and head injuries. However, a number of accidents, particularly rear end collisions, may be prevented by giving the driver of a trailing automobile adequate warning that the leading automobile is rapidly decelerating, as opposed to merely slowing down.

While several systems exist for indicating hard braking of a vehicle, these systems perform inadequately in a number of respects. For example, systems for flashing an automobile's brake lights in response to hard braking of the automobile often include manual reset switches. The automobile's operator must manually reset the system to either stop the lights from flashing or to enable the system for the next hard braking instance. For this reason, such systems increase the operator's workload and further present a potential hazard if the operator fails to reset the system.

Switching in these flashing systems often causes early system failure which may also render the automobile's brake lights inoperable for indicating normal braking. For example, such systems typically, and unnecessarily, switch each time the brake pedal is depressed. Further, the use of mechanical switching arrangements having a number of moving parts can cause premature system failure.

Other systems include complicated brake light flashing circuits which flash an automobile's brake lights for a predetermined period of time. In addition to inadequately indicating panic braking instances, these systems disadvantageously require modifications to the automobile, thus complicating their installation.

Additionally, rapidly slowing or stopping a vehicle on a hill may be more or less dangerous than when the vehicle is on level ground depending on the slope. For example, the operator of a trailing vehicle traveling downhill typically needs earlier warning of panic braking in order to prevent a rear end collision. However, conventional systems fail to accommodate for the vehicle's angle with respect to level ground.

SUMMARY OF THE INVENTION

Among the several objects of this invention may be noted the provision of an improved system permitting signaling of panic braking of an automobile; the provision of such a system which permits detection of the automobile's rate of deceleration during braking; the provision of such a system which permits detection of the automobile's angle of inclination during braking; the provision of such a system which permits connection of a flasher circuit in series with the automobile's brake lights; the provision of such a system which permits flashing the automobile's brake lights when the automobile decelerates at or above a preset rate; the provision of such a system which permits flashing the automobile's brake lights when the automobile's angle of inclination is greater than or equal to a preset angle; the provision of such a system which permits actuating the flasher circuit and maintaining actuation of the flasher circuit with a silicon-controlled rectifier circuit; and the provision of such a system which is economically feasible and commercially practical.

Briefly described, a system of the present invention signals panic braking of a vehicle at or above a preset rate. The vehicle has a brake pedal movable from a nondepressed position to a depressed position for braking the vehicle. The nondepressed and depressed positions correspond to open and closed positions, respectively, of a brake light switch. The vehicle energizes a plurality of brake lights when the brake light switch is in its closed position. The system of the invention includes a mercury switch for detecting a deceleration rate of the vehicle and generates a signal representative of panic braking when the deceleration rate of the vehicle reaches or exceeds the preset panic braking rate. The system also includes a flasher circuit connected in series between the brake light switch and the brake lights for flashing the brake lights and a silicon-controlled rectifier (SCR) circuit for actuating the flasher circuit in response to the panic braking signal and for maintaining actuation of the flasher circuit so long as the brake light switch is in its closed position.

In another form, the invention is directed to a method for signaling panic braking of a vehicle at or above a preset rate. The vehicle has a brake pedal movable from a nondepressed position to a depressed position for braking the vehicle. The nondepressed and depressed positions correspond to open and closed positions, respectively, of a brake light switch. The vehicle has a power supply which energizes a plurality of brake lights when the brake light switch is in its closed position. The method includes the steps of detecting a deceleration rate of the vehicle and generating a signal representative of panic braking when the deceleration rate of the vehicle reaches or exceeds the preset panic braking rate. The method also includes selectively connecting and disconnecting a flasher circuit in series between the power supply and the brake lights to flash the brake lights and actuating the flasher circuit in response to the panic braking signal and maintaining actuation of the flasher circuit so long as the brake light switch is in its closed position.

Alternatively, the invention may comprise various other systems and methods.

Other objects and features will be in part apparent and in part pointed out hereinafter.

BRIEF DESCRIPTION OF THE DRAWING

Corresponding reference characters indicate corresponding parts throughout the drawings.

DETAILED DESCRIPTION OF PREFERRED EMBODIMENTS

Figure 1:
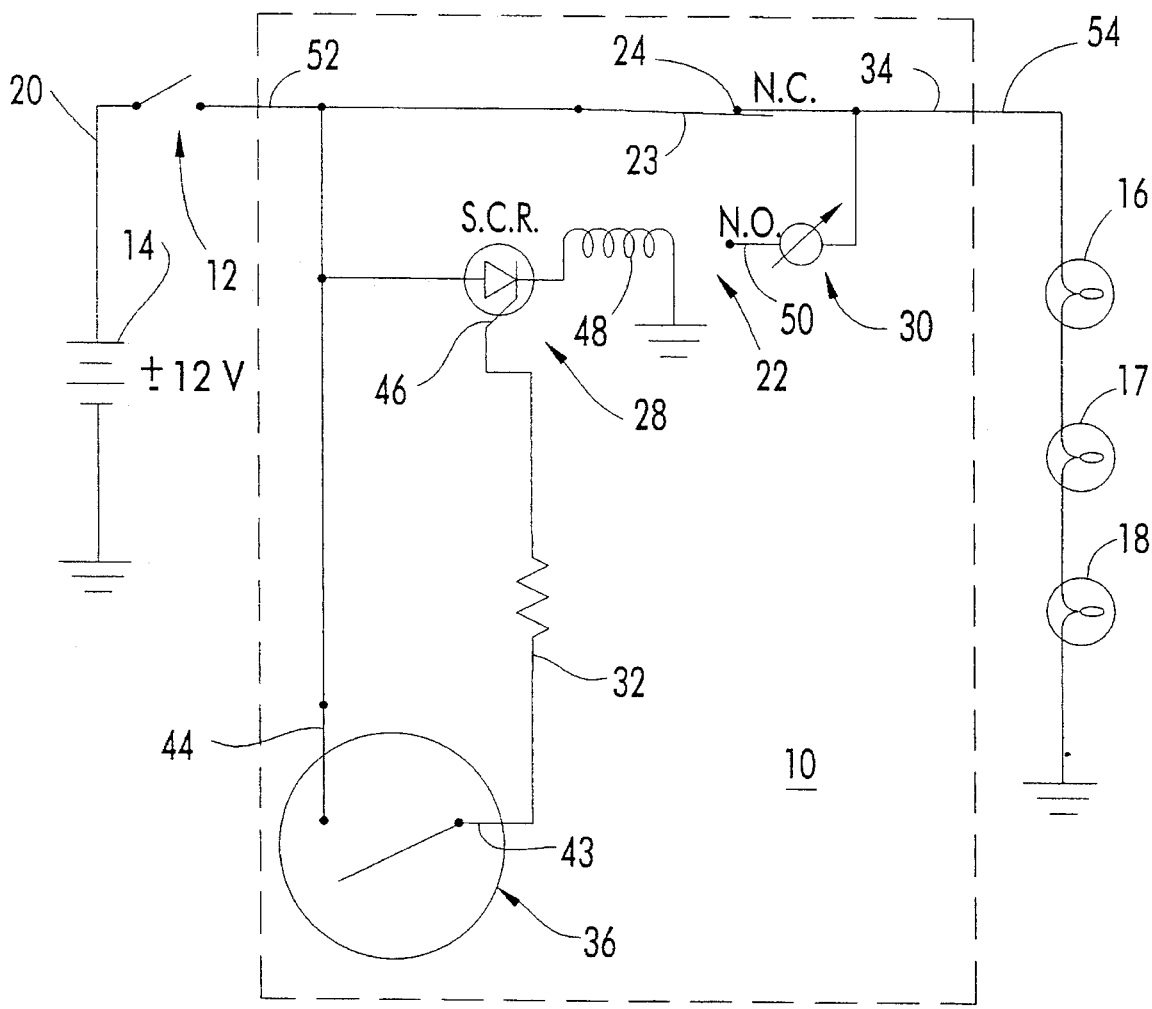
FIG. 1 is a schematic diagram of one preferred embodiment of an inertial brake light system of the invention.

FIG. 1 shows a system 10, one preferred embodiment of the present invention, for signaling panic braking of a vehicle, such as an automobile (not shown). A panic braking instance is defined by the rate at which the vehicle is decelerating and may depend upon other factors, such as the angle of the vehicle's inclination.

The vehicle has a brake pedal (not shown) movable from a nondepressed position to a depressed position for braking the vehicle. The nondepressed and depressed positions correspond to open and closed positions, respectively, of a brake light switch 12, the position of which is controlled by and is responsive to the position of the brake pedal. During routine braking of the vehicle, the operator depresses the vehicle's brake pedal to apply the vehicle's brakes to slow the vehicle. In addition to applying the brakes, depressing the pedal simultaneously closes the brake light switch 12, thus, connecting a power supply, such as a battery 14, to a plurality of brake lights, shown at reference characters 16, 17 and 18. In this manner, current flows from the battery 14, preferably the 12 volt battery already installed in the vehicle, to energize the plurality of brake lights 16–18, when brake light switch 12 is in its closed position. Brake lights 16–18 are energized via line 20 through a single-pole, double-throw (SPDT) relay 22.

Preferably, the SPDT relay 22 is a switch having a switching member 23 movable between a normally closed contact 24 and a normally open contact 26. SPDT relay 22 is responsive to a silicon-controlled rectifier (SCR) circuit 28 for selectively connecting and disconnecting a high speed lamp flasher circuit 30 in series between brake light switch 12 and at least one of brake lights 16–18. Relay 22 selectively connects the vehicle power supply, battery 14, through the flasher circuit 30 to brake light 16, 17 and/or 18 in response to a panic braking signal. In a preferred embodiment of the invention, system 10 generates the panic braking signal via line 32.

In a preferred embodiment of the invention, flasher circuit 30 is an electronic circuit which switches current flowing through the circuit on and off at a preselected rate. Generally, the flashing rate of flasher circuit 30 may be adjusted by adjusting component parameter values of the electronic circuit, such as resistance and capacitance, and the rate is preselected for optimum visibility from trailing vehicles. Alternatively, flasher circuit 30 may also be embodied as a bimetallic strip or other similar device.

Preferably, the switching member 23 of the SPDT relay 22 connects to the normally closed contact 24 to directly connect battery 14 to brake lights 16–18 when brake light switch 12 is closed and when the panic signal is not present on line 32. Normally closed contact 24 is connected so that current flows directly to brake lights 16–18 via line 34 during normal braking operation of the vehicle. In this manner, brake lights 16–18 are steadily illuminated thereby indicating normal braking.

Figure 2:
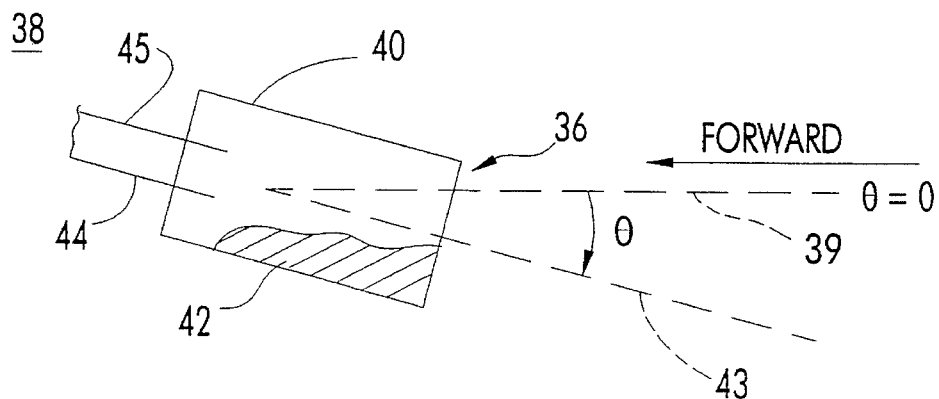
FIG. 2 is a partial diagrammatic cross-sectional view of a mercury switch of the system of FIG. 1.

Referring to FIG. 2, a mercury switch 36 is shown mounted on a portion 38 of the vehicle at an angle Θ with respect to horizontal. Reference character 39 indicates a plane which is generally horizontal. The mercury switch 36 may be embodied as a cylindrical glass tube 40 filled with a globule of mercury 42 and having an axis 43 therethrough. Thus, the angle between the axis 43 and horizontal 39 is defined as Θ. When axis 43 of the tube 40 is aligned with horizontal 39 (i.e., parallel to level ground; θ=0°), the globule of mercury 42 does not move. However, raising axis 43 of tube 40 above horizontal 39, so that Θ<0°, causes the mercury 42 to move toward a pair of contacts 44, 45 thereby to make a circuit. Likewise, tilting tube 40 backwards, i.e., making Θ larger, causes mercury 42 to rest in an end of tube 40 away from the contacts 44, 45. The initial angle Θ may vary according to the specific automobile in which system 10 is installed and also for detection of different deceleration rates. In one preferred embodiment of the invention, angle Θ=6° when the vehicle is at rest on a level surface.

Generally, when an automobile's driver brakes hard, the automobile decelerates rapidly. Also, the tail end of most automobiles rises as its nose drops during hard braking. In the preferred embodiments of the invention, mercury switch 36 is mounted at an angle (Θ>0°) with respect to horizontal. Thus, during a hard (or panic) braking situation, the sudden deceleration of the vehicle and the inertia of liquid mercury 42 causes mercury 42 to move toward the contacts 44, 45, i.e., in the direction of the forward motion of the vehicle. The conductive mercury 42 closes contacts 44, 45 for generating the panic braking signal. As described above, mercury switch 36 is mounted on the vehicle portion 38 displaced at a predetermined angle Θ with respect to horizontal. The predetermined angle Θ corresponds to the preset rate of deceleration corresponding to panic braking.

Mercury switch 36 constitutes means for detecting a deceleration rate and for generating a signal representative of panic braking when the deceleration rate of the vehicle reaches or exceeds the preset panic braking rate. Further, mercury switch 36 constitutes means for detecting a preset angle of inclination of the vehicle and is responsive to the deceleration rate reaching or exceeding the preset panic braking rate and the angle of inclination of the vehicle reaching or exceeding the preset angle for generating the panic braking signal.

Referring again to FIG. 1, system 10 generates the panic braking signal via line 32 in response to hard braking of the vehicle when mercury 42 moves forward to electrically interconnect contacts 44, 45 and close switch 36. In this manner, mercury switch 36 fires SCR circuit 28. Firing SCR circuit 28 switches SPDT relay 22 so that high speed lamp flasher circuit 30 is in series with brake lights 16–18. Thus, brake lights 16–18 rapidly flash to indicate that the vehicle is decelerating at a rate greater than the rate predetermined to correspond to panic braking. Once SCR circuit 28 is fired, brake lights 16–18 will continue to flash rapidly until power is removed from them by releasing the vehicle's brake pedal and opening brake light switch 12.

Thus, rapid deceleration of the vehicle occurring while brake switch 12 is closed generates the panic braking signal on line 32. The panic braking signal is in the form of a voltage from battery 14 which is applied to SCR circuit 28 at its gate, shown at reference character 46. This voltage may be conditioned by a current limiting resistor before applying it to the SCR gate 46 to protect SCR circuit 28 from excessive voltage and/or current. In this manner, gate 46 of SCR circuit 28 is biased so that SCR circuit 28 conducts from its anode side through to its cathode side. The current flowing through SCR circuit 28 energizes a coil 48 of SPDT relay 22. The energized relay coil 48 causes switching member 23 to move from normally closed contact 24 to normally open contact 26 so that current flows via line 50 through high speed lamp flasher 30 rather than flowing via line 34. In this manner, high speed lamp flasher circuit 30 is connected in series between brake light switch 12 and brake lights 16–18 for flashing the lights. SCR circuit 28 actuates flasher circuit 30 in response to the panic braking signal via line 32 and latches on to maintain actuation of flasher circuit 30 so long as brake light switch 12 is in its closed position. Once the brake pedal is released to its nondepressed position to open switch 12, relay coil 48 is de-energized causing it to return the switching member 23 of SPDT relay 22 from its normally open contact 26 to its normally closed position 24. Thus, system 10 rapidly flashes brake lights 16–18 to signal a hard braking instance and then automatically returns to its original state when brake light switch 12 opens.

In normal braking operation of the vehicle, mercury 42 remains in an end of tube 40 of mercury switch 36 away from contacts 44, 45 which remain open circuited. Thus, closing brake light switch 12 by depressing the brake pedal energizes brake lights 16–18 via line 34 without high speed lamp flasher 30 being in series therewith.

According to the present invention, system 10 may be installed with minimal modification to the vehicle. Installation may be accomplished by screwing or bolting system 10 to portion 38 (for example, the interior side of the fire wall of the vehicle). The inertia sensing mercury switch 36 may be hard-mounted inside a rigid case with system 10 at its predetermined desired angle wherein an input wire on one side of the case, shown at reference character 52, connects with the low side of brake light switch 12 and an output terminal on the other side, shown at reference character 54, connects with the factory-installed wire from brake lights 16–18 which would normally connect to the low side of brake light switch 12. If the rigid case is electrically conductive and is electrically bonded to portion 38, the ground on relay coil 48 may be obtained inside the rigid case when portion 38 is electrically connected to the negative terminal of automobile battery 14. Typically, the fire wall of an automobile is connected in this manner. Therefore, system 10 may be installed with essentially no wiring modifications and only a minor interior modification. As such, system 10 requires no interface with other automotive electronic or mechanical systems.

Further, the present invention advantageously provides a low probability of system failure and minimal consequences if system 10 does fail. In the preferred embodiment of the invention, the only mechanical component is relay 22 since flasher 30 may be embodied as a solid-state circuit. Moreover, relay 22 only operates during decelerations indicative of panic stops. Also, mercury switch 36 does not contain any solid moving parts and, thus, provides a virtually unlimited operational lifespan.

System 10 provides logical and consistent interaction with the operator of a vehicle and does not require any special action to activate or deactivate system 10. System 10 flashes brake lights 16–18 when the operator applies the brakes and decelerates at the given rate on a given grade. System 10 stops flashing brake lights 16–18 when the operator removes pressure from the brake pedal, thus allowing it to return to its nondepressed position. Therefore, the vehicle's operator determines when system 10 activates and deactivates flasher circuit 30 without any additional thought or action on his part.

Modern automobiles typically include a minimum of two or three brake lights. In the preferred embodiment of the invention, three brake lights 16–18 flash in response to a panic braking situation. It is to be understood that system 10 of the present invention may flash any arrangement of existing tail lights, brake lights or additional lights which have been retrofitted in the vehicle.

The present invention may be incorporated in various vehicles, including automobiles having reduced nose dive in hard stops. When properly installed, system 10 of the present invention signals trailing vehicles of panic braking situations even when the leading vehicle remains level during hard braking. Further, mounting mercury switch 36 at an angle with respect to horizontal allows system 10 to flash brake lights 16–18 at a lesser rate of deceleration if the vehicle is headed downhill than if it is on level ground or heading uphill. In a preferred embodiment of the invention, mercury switch 36 provides a lower triggering threshold on a downslope because the angle Θ between horizontal 39 and axis 43 of mercury switch 36 is reduced when the vehicle is traveling downhill. Generating the panic braking signal with a lower deceleration triggering threshold for vehicles traveling down a hill, as compared to vehicles traveling on level ground, advantageously protects against possible rear end collisions.

The preferred embodiment of the invention signals panic braking of a vehicle wherein panic braking is defined as deceleration at or above a preset rate. System 10 detects a deceleration rate of the vehicle and generates a signal representative of panic braking when the deceleration rate of the vehicle reaches or exceeds the preset panic braking rate. Selectively connecting and disconnecting flasher circuit 30 in series between the vehicle's power supply 14 and its brake lights 16–18 provides for flashing brake lights 16–18 in response to the panic braking signal. SCR circuit 28 actuates flasher circuit 30 in response to the panic braking signal and latches to maintain actuation of flasher circuit 30 so long as brake light switch 12 is in its closed position. Thus, SCR circuit 28 maintains the connection of power supply 14 through flasher circuit 30 to brake lights 16–18 until brake light switch 12 is in its open position.

Displacing mercury switch 36 at a predetermined angle with respect to horizontal corresponding to the preset panic braking rate provides system 10 with the ability to detect a deceleration rate in combination with a preset angle of inclination of the vehicle. The panic braking signal is, thus, responsive to the deceleration rate reaching or exceeding the preset panic braking rate in combination with the angle of inclination of the vehicle reaching or exceeding the preset angle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for signaling panic braking of a vehicle wherein panic braking is defined as braking at or above a preset deceleration, the vehicle having a brake pedal movable from a nondepressed position to a depressed position for braking the vehicle and having a normally open brake light switch, the nondepressed and depressed positions of the brake pedal corresponding to open and closed positions, respectively, of the brake light switch, said system being connected to a power supply through the brake light switch when the brake light switch is in its closed position, said system comprising:

means for detecting a deceleration of the vehicle and for generating a signal representative of panic braking when the detected deceleration of the vehicle reaches or exceeds the preset deceleration;

a brake light energized by the power supply when the brake light switch is in its closed position;

flasher circuit means selectively connected in series between the brake light switch and the brake light for flashing the brake light during panic braking; and latchable silicon-controlled rectifier (SCR) circuit means having an input for receiving the panic braking signal, said SCR circuit means connecting the brake light through the flasher circuit means to the brake light switch and the power supply in response to the panic braking signal thereby actuating the flasher circuit means during panic braking, said SCR circuit means being latched during panic braking when the brake light switch is in its closed position whereby the flasher circuit means flashes the brake light until the brake light switch is returned to its open position.

2. The system of claim 1 wherein the SCR circuit means includes switching means for selectively connecting the flasher circuit means in series between the brake light switch and the brake light during panic braking.

3. The system of claim 2 wherein the switching means comprises a relay for selectively connecting the power supply through the flasher circuit means to the brake light.

4. The system of claim 3 wherein the switching means includes a normally closed switch for connecting the power supply to the brake light when the brake light switch is closed and the panic braking signal is not present.

5. The system of claim 4 wherein the relay comprises a single pole, double-throw relay.

6. The system of claim 1 wherein the means for detecting a deceleration of the vehicle and for generating a signal representative of panic braking comprises a mercury switch mounted on the vehicle displaced at a predetermined angle with respect to horizontal, said angle corresponding to the preset deceleration, said mercury switch including a pair of contacts opened and closed by movement of liquid mercury within the mercury switch, the movement of the liquid mercury to close the contacts being a function of the predetermined angle, whereby deceleration of the vehicle reaching or exceeding the preset deceleration overcomes the inertia of the liquid mercury in the mercury switch and causes the liquid mercury to close the contacts of the mercury switch for generating the panic braking signal.

7. The system of claim 1 wherein the means for detecting a deceleration of the vehicle and for generating a signal representative of panic braking comprises means for detecting a preset angle of inclination of the vehicle and is responsive to the deceleration reaching or exceeding the preset deceleration and the angle of inclination of the vehicle reaching or exceeding the preset angle for generating the panic braking signal.

8. The system of claim 7 wherein the means for detecting a deceleration of the vehicle and a preset angle of inclination of the vehicle and for generating a signal representative of panic braking comprises a mercury switch mounted on the vehicle displaced at a predetermined angle with respect to horizontal, said predetermined angle corresponding to the preset deceleration, said mercury switch including a pair of contacts opened and closed by movement of liquid mercury within the mercury switch, the movement of the liquid mercury to close the contacts being a function of the predetermined angle, whereby deceleration of the vehicle reaching or exceeding the preset deceleration and the angle of inclination of the vehicle reaching or exceeding the preset angle overcomes the inertia of the liquid mercury in the mercury switch and causes the liquid mercury to close the contacts of the mercury switch for generating the panic braking signal.

9. A system for signaling panic braking of a vehicle wherein panic braking is defined as braking at or above preset criteria, the vehicle having a brake pedal movable from a nondepressed position to a depressed position for braking the vehicle and having a normally open brake light switch, the nondepressed and depressed positions of the brake pedal corresponding to open and closed positions, respectively, of the brake light switch, said system being connected to a vehicle power supply through the brake light switch when the brake light switch is in its closed position, said system comprising:

a mercury switch mounted on the vehicle for detecting a deceleration and an angle of inclination of the vehicle and for generating a signal representative of panic braking when the detected deceleration of the vehicle and its detected angle of inclination reaches or exceeds the preset panic braking criteria;

a brake light energized by the power supply when the brake light switch is in its closed position;

flasher circuit means selectively connected in series between the brake light switch and the brake light for flashing the brake light during panic braking;

latchable silicon-controlled rectifier (SCR) circuit means for actuating the flasher circuit means in response to the panic braking signal, said SCR circuit means being latched during panic braking when the brake light switch is in its closed position whereby the flasher circuit means flashes the brake light until the brake light switch is returned to its open position; and a relay responsive to the SCR circuit means for selectively connecting the flasher circuit means in series between the brake light switch and the brake light during panic braking.

10. A method for signaling panic braking of a vehicle wherein panic braking is defined as braking at or above a preset deceleration, the vehicle having a brake pedal movable from a nondepressed position to a depressed position for braking the vehicle and having a normally open brake light switch, the nondepressed and depressed positions corresponding to open and closed positions, respectively, of the brake light switch, a brake light being connected to a vehicle power supply through the brake light switch when the brake light switch is in its closed position, the method comprising the steps of:

detecting a deceleration of the vehicle;

generating a signal representative of panic braking when the detected deceleration of the vehicle reaches or exceeds the preset deceleration;

selectively connecting a flasher circuit in series between the brake light switch and the brake light to flash the brake light during panic braking;

actuating the flasher circuit in response to the panic braking signal; and latching a silicon-controlled rectifier circuit when the brake light switch is in its closed position thereby to maintain actuation of the flasher circuit until the brake light switch is returned to its open position.

11. The method of claim 10 further comprising the step of displacing a mercury switch at a predetermined angle with respect to horizontal, the predetermined angle corresponding to the preset deceleration, said mercury switch including a pair of contacts opened and closed by movement of liquid mercury within the mercury switch, the movement of the liquid mercury to close the contacts being a function of the predetermined angle, whereby deceleration of the vehicle reaching or exceeding the preset deceleration overcomes the inertia of the liquid mercury in the mercury switch and causes the liquid mercury to close the contacts of the mercury switch for generating the panic braking signal.

12. The method of claim 10 wherein the step of detecting a preset angle of inclination of the vehicle and wherein the step of generating the panic braking signal is responsive to the detected deceleration reaching or exceeding the preset deceleration and the angle of inclination of the vehicle reaching or exceeding the preset angle.

13. A system for signaling panic braking of a vehicle wherein panic braking is defined as braking at or above a preset deceleration, the vehicle having a brake pedal movable from a nondepressed position to a depressed position for braking the vehicle and having a normally open brake light switch, the nondepressed and depressed positions of the brake pedal corresponding to open and closed positions, respectively, of the brake light switch, said system being connected to a vehicle power supply through the brake light switch when the brake light switch is in its closed position, said system comprising:

a panic braking circuit for detecting a deceleration of the vehicle and for generating a signal representative of panic braking when the detected deceleration of the vehicle reaches or exceeds the preset deceleration;

a flasher circuit selectively connected in series between the brake light switch and a light emitting device for flashing the light emitting device during panic braking; and a latchable silicon-controlled rectifier (SCR) circuit having an input for receiving the panic braking signal, said SCR circuit connecting the light emitting device through the flasher circuit to the brake light switch and the power supply in response to the panic braking signal thereby actuating the flasher circuit during panic braking, said SCR circuit being latched during panic braking when the brake light switch is in its closed position whereby the flasher circuit flashes the light emitting device until the brake light switch is returned to its open position.

14. The system of claim 13 wherein the light emitting device comprises a brake light.

* * * * *